United States Patent [19]
Renaud

[11] Patent Number: 4,507,844
[45] Date of Patent: Apr. 2, 1985

[54] T-ASSEMBLY AND METHOD OF OBTAINING SAME

[75] Inventor: Maurice Renaud, 66 Chemin des Bretoux, 95320 Saint Leu la Foret, France

[73] Assignee: Maurice Renaud, France

[21] Appl. No.: 303,038

[22] Filed: Sep. 17, 1981

[30] Foreign Application Priority Data

Oct. 6, 1980 [FR] France .................................. 80 21307
Jun. 30, 1981 [FR] France .................................. 81 12817

[51] Int. Cl.$^3$ ............................................. B23P 11/02
[52] U.S. Cl. .................................... 29/522 R; 29/525;
182/228; 403/242
[58] Field of Search ............. 29/235, 453, 525, 522 R;
403/381, 282, 242; 182/228, 194, 215

[56] References Cited
U.S. PATENT DOCUMENTS

| 2,614,827 | 10/1952 | Peach et al. | |
| 2,809,846 | 10/1957 | Whiteford | 29/525 |
| 2,834,321 | 5/1958 | Duefrene | 29/453 |
| 2,950,458 | 8/1960 | Artz | 29/453 |
| 3,064,707 | 11/1962 | Walts | |
| 3,286,804 | 11/1966 | Bernheim | 193/25 R |
| 3,513,534 | 5/1970 | Bradley | 29/525 |
| 3,602,980 | 9/1971 | Heffner | 29/522 |
| 4,168,054 | 9/1979 | Weiland | 403/242 |

FOREIGN PATENT DOCUMENTS 826246 12/1951 Fed. Rep. of Germany .
2019367 11/1971 Fed. Rep. of Germany ...... 403/381
1247439 10/1960 France .

OTHER PUBLICATIONS

Belgium Abstract–466,463; Jul. 1946; Johnson, pp. 1056 and 1057.

Primary Examiner—Reinaldo P. Machado
Assistant Examiner—Alvin Chin-Shue
Attorney, Agent, or Firm—Fisher, Christen & Sabol

[57] ABSTRACT

This T-assembly of the tenon and mortise type for two perpendicular metal tubes comprises a mortise formed in one tube and having an omega shape in cross section, through the local distortion of the tube wall, by depressing said wall towards its opposite lateral wall, without breaking the continuity of the tube surface, the tenon being obtained on the other hand by simply crushing to a slightly dovetail configuration the end of the other tube, the tenon comprising at least one collar-shaped external protrusion adapted notably to engage the outer portion of the mortise.

4 Claims, 8 Drawing Figures

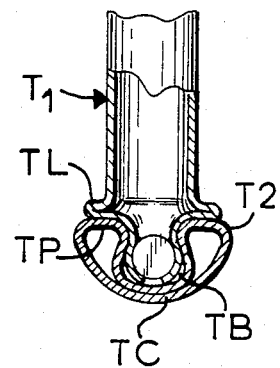
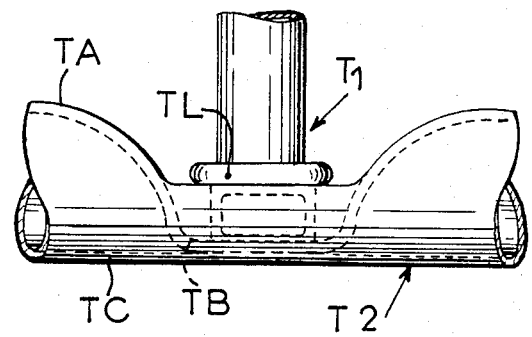
FIG.2  FIG.3
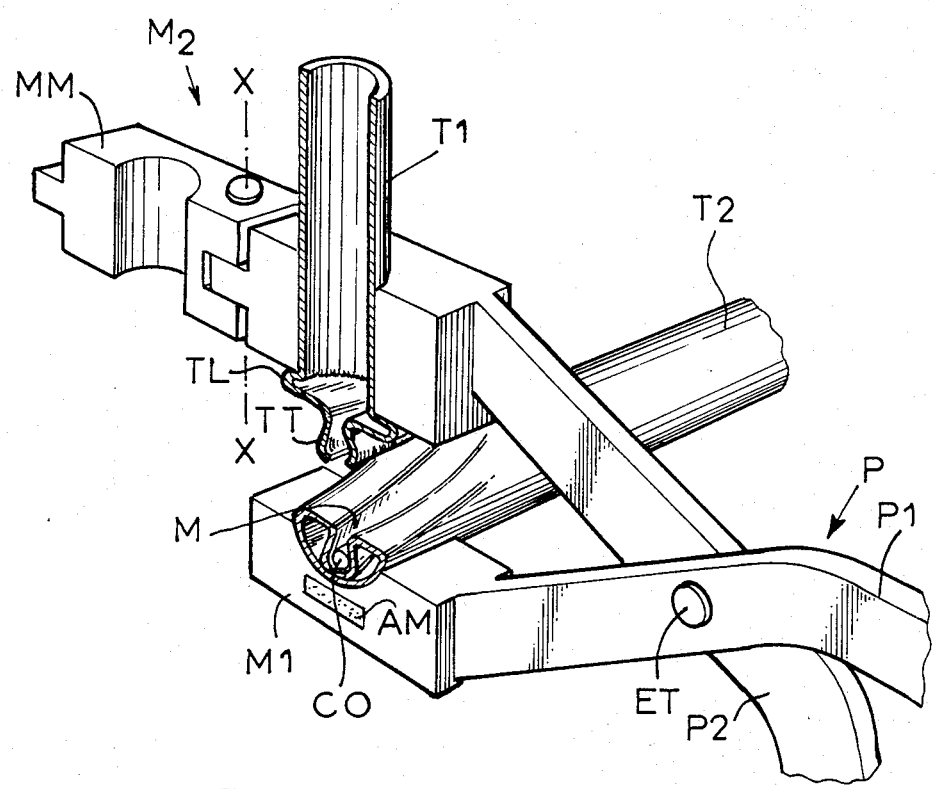
FIG.4

T-ASSEMBLY AND METHOD OF OBTAINING SAME

BACKGROUND OF THE INVENTION

1. Field of the Invention

The present invention relates to the snap-action self-assembling of tubes for constructing high-strength modules of any desired configuration without resorting to fastening means except for the shaping the tubes, the assembly thus obtained being adapted to be disassembled manually, i.e. without using any tool means.

More particularly, the basic principle of this self-assembly implies the combination of various shaping steps carried out intermediate and at the tube ends, and so located as to provide the desired assemblies.

2. Description of the Prior Art

It is already known to assemble definitely of permanently tubular members by welding, hard-soldering, punching, embossing, machining or the like. In all cases, to achieve these assemblies, it is necessary to either split the tube or partially break the tube section, thus reducing considerably the final strength of the assemblies. On the other hand, additional metal or other components outside the tubes is or are necessary, and furthermore the inner walls of the tubes against are not protected in all cases against corrosion.

SUMMARY OF THE INVENTION

With the tubular modules according to the present invention it is possible to assemble by snap action two metal tubes to a T-shaped configuration, somewhat in the fashion of tenon and mortise joints, wherein the mortise cross-section is substantially omega-shaped and obtained through local distortion of the wall of the first tube by pressing one portion of its lateral surface towards the opposite lateral surface, whereby the tube section remains unbroken; the tenon, of slightly dovetail configuration, is obtained by simply crushing the end of the other tube.

Other advantages and features of the invention will appear as the following description proceeds with reference to the attached drawings, in which:

BRIEF DESCRIPTION OF THE DRAWINGS

FIGS. 2 and 3 are a fragmentary section and an elevational view, respectively, of the assembly of FIG. 1;

FIG. 4 illustrates a typical form of embodiment of a clamp incorporated in a device for facilitating the positioning the two tubular members to be assembled;

DESCRIPTION OF THE PREFERRED EMBODIMENT

Figure 1:
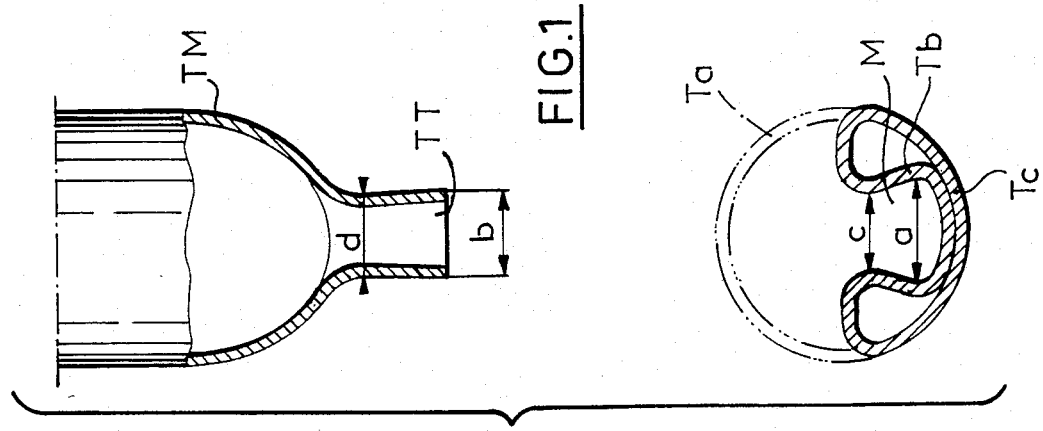
FIG. 1 is an exploded view of a tenon and mortise assembly.

As illustrated in FIG. 1, the mortise M formed in tube T2 is obtained by depressing the tube wall Ta so that it assumes the shape Tb engaging the undistorted wall Tc.

Advantageously, the cross-sectional configuration of the depressed wall portion Tb corresponds substantially to the Greek letter omega, and such that the ingress c be narrower than the widest inner portion a.

On the other hand, one end of the other tube TM is crushed to form a tenon TT slightly wider at its outer end b than at d, as shown. Due to this difference in thickness, the tenon TT constitutes a kind of dovetail.

It is thus clear that when the tenon TT is forced through the neck c of the omega mortise M, the leading portion b of the tenon will push the sides of this neck apart and penetrate snappily into the wider portion a. The inherent elasticity of the metal restores the neck c to its initial width when it registers with the narrower portion d of tenon TT. According to the magnitude of the tenon taper and to the difference in width between c and a, the snap action may be varied to facilitate or prevent the disassembling of the tubes thus assembled.

FIG. 2 illustrates a specific arrangement wherein the snap assembly is such that it is hardly possible to remove the tenon from the mortise, the assembly having in this case a strength comparable to that of a welded joint.

To make this snap-in assembly definitive, a cylindrical member CO is inserted into the hollow of the omega depression, whereafter the tenon TT is driven home into the mortise M as in the preceding case, but by using a mallet so that then cylinder CO fits tightly into the open inlet end b of tenon TT.

It is clear that this cylindrical member CO will act as a wedge causing this inlet b to bulge irremediably, thus making it impossible to remove the tenon from the mortise.

As also shown in FIGS. 2 and 3, the fitting of tube T1 in tube T2 may be facilitated and made steadier by forming a projection TL, for example of collar-like configuration, on tube T1 adjacent the narrower portion of the dovetail. This projection TL has a twofold purpose, namely providing a shoulder on tube T1 for engagement with a relatively flat portion TP of tube T2 and a surface sufficient for withstanding the force necessary for driving the tenon TT into the mortise M.

In fact, it was noticed that, especially when relatively long tubes T1 are used, it was particularly difficult to obtain a proper fitting. To facilitate this engagement and provide the force necessary therefor, special pliers are provided within the scope of the present invention, as illustrated in FIG. 4.

The pliers P comprise two arms P1, P2 pivotally interconnected at ET and each arm comprises a different jaw M1, M2. One jaw M1 acts as an anvil and comprises on the one hand a transverse groove MG adapted to receive the lower portion of the lateral surface of tube T2, and on the other hand a permanent magnet AM constantly tending to hold the tube T2 against movement, provided of course that this tube consists of magnetic metal. Advantageously, the jaw M2 is completed by a pivotally mounted flat hook VO assisting in holding the tube T2 in position.

The upper jaw M2 consists of two hingedly connected members MF and MM having a common hinge axis XX. Each member MF, MM comprises a semi-cylindrical vertical groove of a diameter only slightly greater than that of tube T2.

After pre-shaping the tenon TT as explained hereinabove and shown in FIGS. 1 and 3 of the drawings, the tube T1 is laid into the groove MG and the flat hook VO is lowered to its tube clamping position, whereafter this tube T1 is disposed between the jaws M1 and M2.

By simply moving the two handles of pliers P toward each other the jaw M2 will bear against the collar TL, cause the tenon TT to part the lips of mortise M so as to penetrate into the underlying cavity, and finally cause the wedge forming cylindrical member CO to penetrate in turn into the end of tube T1.

Figure 6:
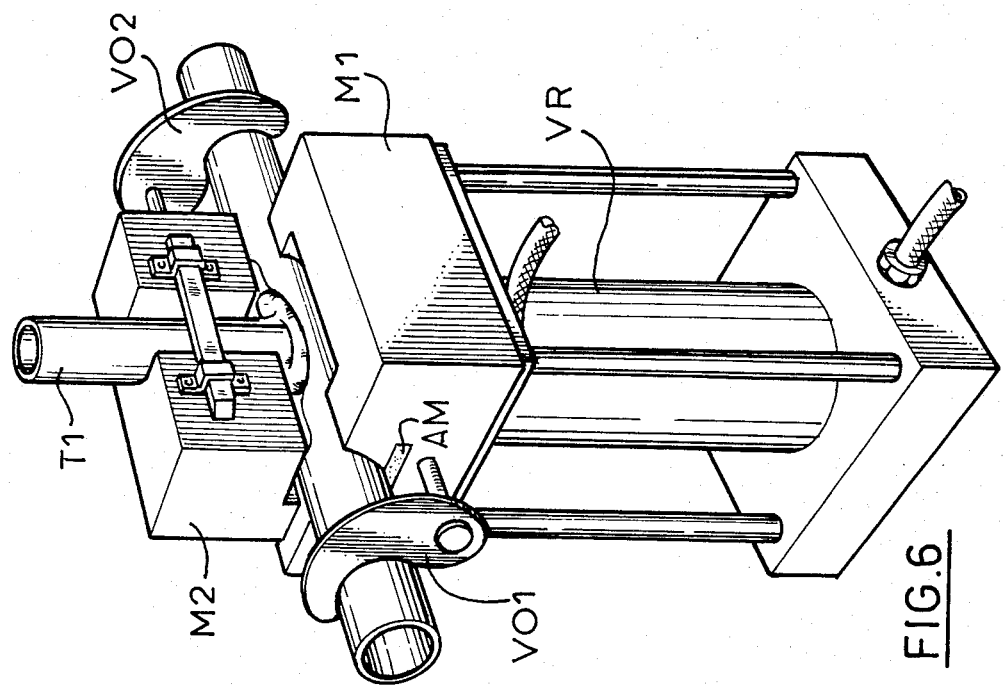
FIGS. 5 and 6 illustrate two modified forms of embodiment of the invention.
Figure 5:
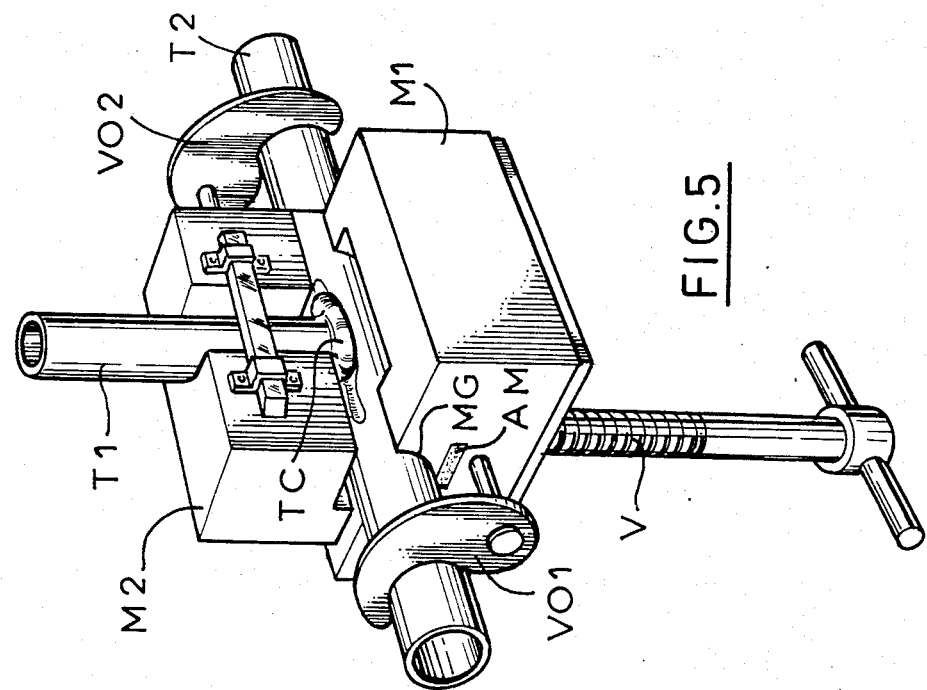

In the modified forms of embodiment shown in FIGS. 5 and 6, the same component elements and/or equivalent means are provided, only the jaw actuating means differing from those of the first form of embodiment. In the example shown in FIG. 5, one of the jaws is axially rigid with a screw V, the other jaw constituting a nut engaged by this screw. Pivotally mounted on each jaw is a notched disc or hook matching the diameter of tube T2 and adapted to be lowered thereupon during the assembling operation. In the example illustrated in FIG. 6, one of the jaws is rigid with the piston of a fluid-actuated cylinder VR having its body rigid with the other jaw.

Figure 7:
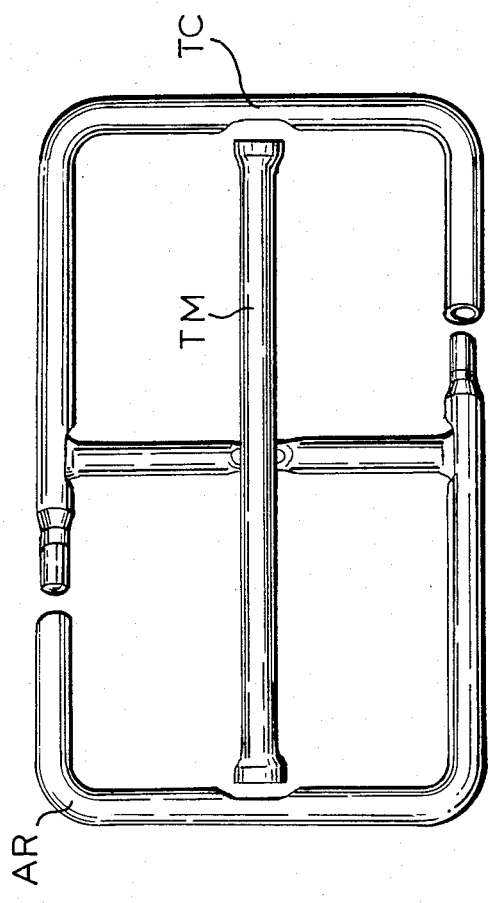
FIG. 7 illustrates a structure constituting for example a rigid module applicable to many types of constructions, notably as a reinforcing member or armature by over-molding plastics in the manufacture of a material-handling pallet shown diagrammatically in cross section in FIG. 8.
Figure 8:
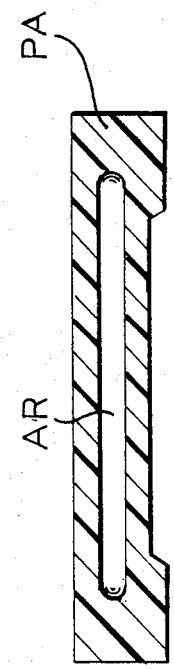

FIG. 7 illustrates a practical and exemplary form of embodiment of a module assembled by using the method of this invention. In this example, the frame with two cross-ties may constitute the reinforcing structure AR of a molded plastic part, such as a material handling pallet PA (FIG. 8), the drawing being clear enough to dispense with additional details and explanations.

A module according to the present invention may if desired comprise only parallel, spaced cross members so that ladders, gates or fences can be constructed very economically. It is also possible to apply the present invention to the construction of frames for shelves, storage racks, balconies, or scaffoldings, metal frameworks, pieces of furniture, luggages rails for cars, and the like.

What is claimed as new is:

1. A method of assembling two tubes to form a T-assembly which rigidly interconnects the two tubes, comprising the steps of: initially deforming a first wall portion of a first hollow cylindrical tube laterally toward a diametrically opposed wall portion of said first tube, said diametrically opposed wall portion being sufficiently supported during deformation of said first wall portion to maintain the shape of said diametrically opposed wall portion; said first wall portion being deformed along a generally linear portion thereof in a direction parallel to the longitudinal axis of said first tube thereby forming an elongated groove; during forming of said elongated groove, said first wall portion being deformed without breaking continuity thereof into a shape conforming to and in contact with an interior surface of said diametrically opposed wall portion along a predetermined distance; said predetermined distance being sufficiently less than one-half the circumferential length of said first hollow cylindrical tube that a neck is formed by regions adjacent said first wall portion of said first hollow cylindrical tube on either side thereof, said neck being formed to have a predetermined minimum width which is sufficiently less than said predetermined distance of contact so as to form a generally dove-tail shape with neck walls being sufficiently spaced away from any other tube wall surfaces to enable said neck walls to be resiliently flexed away from one another without permanent deformation of said neck during forcible insertion through said neck of a tongue having a predetermined maximum width sufficiently large to cause separation of said neck walls during insertion of said tongue member between said neck walls;

said tongue member being formed by deforming opposing side wall portions of a free end of a second hollow cylindrical tube toward one another without breaking continuity of said wall portions to form a pair of generally linear lips having a predetermined length; said lips being connected together at either edge thereof by portions of said second hollow cylindrical tube, said lips being adapted to be received in said elongated groove; said lips being spaced apart a predetermined distance at said free end of said second hollow cylindrical tube, said lips extending axially along said second hollow cylindrical tube a predetermined distance approximately equal to a depth of said elongated groove as measured from said neck to said first wall portion in contact with said interior surface; said lips converging toward one another generally smoothly axially along said predetermined distance approximately equal to said depth of said elongated groove and then diverging generally smoothly to an undeformed portion of said second hollow cylindrical tube; said lips having a predetermined minimum width generally equal to said predetermined minimum width of said neck of said groove in said first hollow cylindrical tube; and placing a rod in said groove, said rod having a predetermined diameter larger than said predetermined spacing of said lips at said end of said second hollow cylindrical tube; said rod being sufficiently strong to deform said lips apart when sufficient force is applied between said rod and said lips; said rod having an axial length less than said predetermined length of said lips so that said lips, upon application of sufficient axial force along said second hollow cylindrical tube against said groove can be deformed about said rod;

orienting a longitudinal axis of said second hollow cylindrical tube generally perpendicularly to a longitudinal axis of said first hollow cylindrical tube; inserting said lips at said free end of said second hollow cylindrical tube into said groove by application of sufficient force to urge said second hollow cylindrical tube along said longitudinal axis of said second hollow cylindrical tube toward said groove until said lips deform said neck walls outwardly and pass to penetrate into said groove to meet said rod; and applying sufficient force to said second tube along its said longitudinal axis to deform said lips outwardly against said rod; said lips being deformed outwardly such that said lips are spaced apart a greater distance than said neck, interior surfaces of said lips being in mating contact with said rod, and exterior surfaces of said lips being in mating engagement with said neck walls and being in contact with said first wall portion at a base of said groove; said neck walls resiliently returning toward said predetermined minimum width, such that said lips and said groove form a strong joint.

2. A method of assembling two tubes as claimed in claim 1, wherein said groove has a bottom portion, said bottom portion of said groove being formed to be in contact with said diametrically opposed portion for a length greater than one fifth the diameter of said first tube.

3. A method of assembling two tubes as claimed in claim 1, further including the step of deforming said first hollow cylindrical tube to form a collar-like projection on said second tube at a location adjacent said minimum width of said tongue member on an opposite side of the location of said minimum width from said lips than said free end of said second hollow cylindrical tube, so as to form a load-distributing portion adapted to abut an uppermost portion of said second hollow cylindrical tube adjacent said groove when said lips are assembled together in a joint with said groove.

4. A method of assembling two tubes as claimed in claim 1, wherein in the said step of deforming said first tube said groove is formed intermediate the length of said first hollow cylindrical tube such that no free first hollow cylindrical tube end is deformed.

* * * * *